Figure 1:
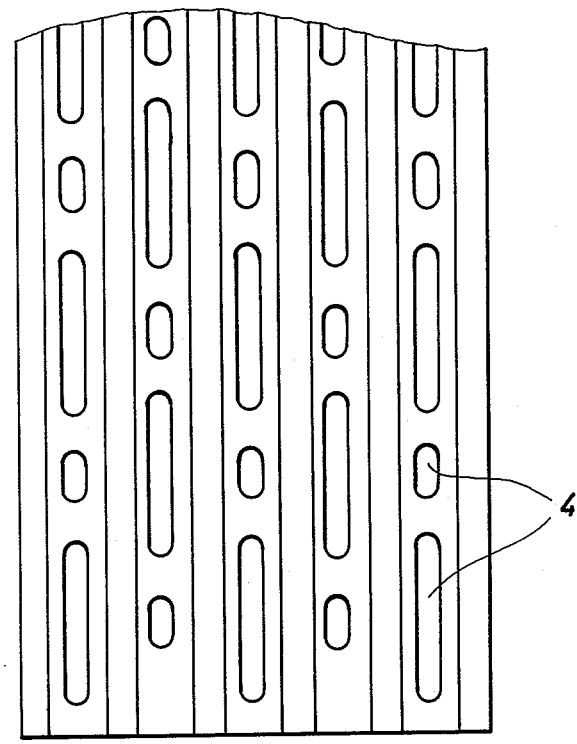

United States Patent [19]

Clemmesen

[11] 4,320,719
[45] Mar. 23, 1982

[54] BUILDING UNIT FOR PIGGERIES

[76] Inventor: Sven O. Clemmesen, Plantagevej 20, DK-2820 Gentofte, Denmark

[21] Appl. No.: 128,547

[22] Filed: Mar. 10, 1980

[30] Foreign Application Priority Data

Aug. 31, 1979 [DK] Denmark .............................. 3670/79

[51] Int. Cl.³ .......................... A01K 1/00; E04C 2/42
[52] U.S. Cl. ......................................... 119/28; 52/660
[58] Field of Search ................ 119/28, 20, 16; 52/660

[56] References Cited

U.S. PATENT DOCUMENTS

| 927,467 | 7/1909 | Fargo | 119/28 |
|---|---|---|---|
| 3,039,575 | 6/1962 | Graham | 52/660 |
| 3,074,339 | 1/1963 | Pennati | 98/40 |
| 3,215,118 | 11/1965 | Behlen | 119/20 |
| 4,182,271 | 1/1980 | Dodge et al. | 119/28 |

Primary Examiner—Hugh R. Chamblee
Attorney, Agent, or Firm—Fitch, Even, Tabin, Flannery & Welsh

[57] ABSTRACT

A piggery comprises a water-cooled metal ceiling, said piggery being run by making the cooling of the metal ceiling and of the air carried into the piggery through openings in the ceiling, dependent primarily of automatical sluicing devices and secondarily controlled by temperature and relative moisture in the piggery in such a manner that the flow of cooling water, which is completely or partially introduced through water nozzles over the metal ceiling, is increased when the automatical sluicing devices are worked or the temperature in the piggery is too high, whereby optimum conditions for the interior climate of the piggery are obtained with the least possible draft.

5 Claims, 3 Drawing Figures

BUILDING UNIT FOR PIGGERIES

The present invention relates to a method of running piggeries, in which the pigs walk on a perforated floor draining off urine and faeces, and in which the liquid consumption of the pigs is determined by the pigs themselves by working of an automatical sluicing device.

The method is especially intended for running piggeries in hot climates, where the problem is to maintain a temperature optimum for the utilization of the hog feed and the growing of the pigs.

The optimum temperature for the growing of pigs is 18° to 20° C., through minor deviations may be tolerated depending on the humidity of the atmosphere and other circumstances without thereby involving serious consequences for the growing of the pigs and the utilization of the hog feed. At a too high temperature the pigs do not eat sufficiently, and at a too low temperature the utilization of the feed is too low. A pig converts optimally about 2.6 kg of feed into 1 kg of pork.

In hot climates attempts have been made to keep the temperatures in piggeries down by means of ventilators, which, however, involves essential draw-backs because pigs are sensitive to draft and are more easily attacked by diseases in draft, and because ventilators make noise which also has an unfortunate influence on pigs.

As pigs do not have sweat glands over the entire body, but only on the snout, on the hindquarters, and at the hoofs, it is not possible merely by observation of a pig to determine whether or not it is too hot. Besides, a temperature regulation based on observation of the pigs would be unpractical when running a piggery optimally automated where it is a matter of saving labour.

When a pig is too hot, it tries to be cooled either by slushing or by drinking, and these two behaviours may therefore be utilized for a regulation of the temperature. Among other things, the method according to the invention is based on the utilization of the drinking habits of pigs for regulating the temperature in a piggery.

The method according to the invention is characterized by the piggery comprising a metal ceiling being cooled by flowing water and which is connected to the automatical sluicing device in such a manner that the rate of flow is increased during working of the automatic sluicing device, and in which a slight sub-atmospheric pressure is maintained under the perforated floor.

As a result, a nearly laminar, vertical and slow flow of cooling air from the ceiling to the floor in the piggery is obtained contrary to the turbulent, draft-producing air current provided by ventilators, and an increased cooling effect is obtained when the pigs through drinking indicate that they are too hot. A further advantage by this laminar vertical flow obtained by the method according to the invention is that ammonia and other smelling substances are removed more efficiently than by the known methods in which large ventilators stir the air before it is sucked out. This is of great importance because the ammonia unbalances the acid-base-equilibrium in the blood the pigs whereby the sensitiveness to diseases is increased and the growth per kg of feed is reduced.

The water flowing over the metal ceiling may optionally be the drinking water, which passes directly on to the automatical sluicing device, which provides a particularly simple construction of the piggery. The cooling water and the drinking water may, of course, also come from different sources, and the regulation of the flow of cooling water may for instance be performed by coupling the automatical sluicing device to a valve in the flow of cooling water in such a manner that working of the automatical sluicing device opens said valve more.

The method according to the invention may be further improved by the flow of cooling water in addition to being controlled by the automatical sluicing device, also being controlled by a thermal feeler gauge and a hygrometer.

An additional improvement of the cooling effect and of the laminar flow is obtained according to the invention, by employing a perforated metal ceiling, and by performing an atomization of cooling water over said ceiling regulated by the temperature and the relative humidity in the piggery. The atomized water then partly cools the air and passes through the perforated ceiling and falls down on the pigs and cools said pigs to the extent it is not already evaporated.

The invention furthermore relates to a piggery comprising a perforated floor draining off urine and faeces, and an automatical sluicing device for the pigs, and the piggery is characterized by comprising a metal ceiling adapted to be cooled by a flow of cooling water, the rate of which is regulated by the automatical sluicing device in such a manner that the flow is increased during working of the automatical sluicing device, or to be heated by hot water when the piggery is too cold.

It is preferred that the metal ceiling is made of stainless steel or copper.

A particularly advantageous embodiment of the piggery according to the invention, in which the perforated floor is of metal, is characterized by the floor comprising a top side reflecting radiation of heat, and by the ceiling comprising an underside absorbing radiation of heat. In this manner the heat regulation of the pigs by radiation is optimally increased so that the necessary air current based on suction under the floor is minimized.

According to the invention the metal ceiling is preferably a perforated plate, over which the cooling water is passed, a free space being provided between said plate and the roof of the piggery. In this manner it is rendered possible to put in supplementing cooling means in the form of the previously mentioned nozzles for atomization of cooling water, in the free space.

The invention moreover relates to a building unit for use as a floor or a ceiling in a piggery, said building unit being a corrugated metal plate of such a profile that it comprises plane parallel wave crests and troughs connected by walls which form an angle of about 45° with the two planes, the plate comprising openings in one of said planes.

Such a building unit is suited for use both as floor and as ceiling in a piggery according to the invention, and when used as floor it is arranged in such a manner that the openings are provided in the wave troughs and constitute the perforations, through which urine and faeces are drained off at the walk of the pigs on the unit, and when used as a ceiling it is arranged in such a manner that the openings are provided in the wave crests, whereby the wave troughs may constitute channels, through which cooling water flows.

The building unit is preferably made of stainless steel since such a building unit of the described corrugated profile possesses such a high strength that an appropriately large floor surface may be composed of building units without a high number of supports. Furthermore stainless steel is particularly easy to clean and is suited for the above principle concerning utilization of radiation for cooling the pigs since a bright plate of stainless steel used for the floor is very radiation-reflecting, and a mat or black plate of stainless steel is very radiation-absorbing and very heat-radiating in case the ceiling is used for heating.

The building unit is preferably shaped with such dimensions of wave crests, troughs, and openings that it is suited as floor for all sizes of pigs, i.e. the openings must be so small that the hoofs of piglets do not go through the openings. On the other hand the openings must be as large as possible to provide the best possible cleaning out of faeces when the pigs are walking on the floor. It has turned out to be most advantageous to employ openings of a width of 9 mm for these purposes. Openings of this size are, however, so large that the teats of a sow can go through them, and in order to avoid tearing of the teats of the sow on the rim of the openings the openings therefore preferably have recurved rims.

Figure 2:
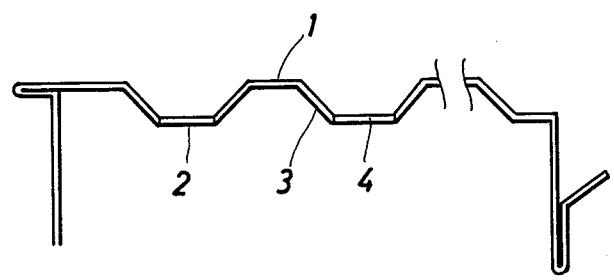
Figure 3:
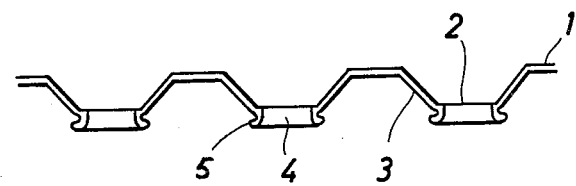

The invention will be described below with reference to the accompanying drawing, in which FIG. 1 is a plan view of a building unit according to the invention, FIG. 2 is a cross-sectional view on a larger scale of a building unit according to the invention, and FIG. 3 is a cross-sectional view of another embodiment of a building unit according to the invention.

The building unit consists of a metal plate bent into such a profile that it presents plane wave crests 1 and plane wave troughs 2 connected by walls 3, said walls forming an angle of 45° with the two planes. In one of the planes forming either a wave crest or a wave trough, openings 4 are provided which are of varying lengths as shown in FIG. 1, but which preferably are of a width not exceeding 9 mm. In the embodiment of the building unit illustrated in FIG. 3 the openings 4 have recurved rims 5.

FIG. 2 illustrates how the rims of the plate may be shaped in such a manner that several plates may be assembled by means of flanges in a manner permitting a quick mounting and demounting without employing bolts, and which provides the highest possible increase of the strength of the plate in the longitudinal direction and the best possible cleaning.

When wave crests and wave troughs are of equal lengths as illustrated in FIG. 2, the building unit may be arranged in such a manner that the openings 4 are in the lower plane of said two planes presented by the corrugated plate, i.e. that the openings are provided in wave troughs, whereby the building unit may act as floor in a piggery. When the building unit is turned, the openings are provided in wave crests and the wave troughs are then channels, through which cooling liquid may circulate, whereby the building unit may act as ceiling in a piggery. When water is atomized over the ceiling, a part thereof is just mixed with the water in the channels, whereas another part thereof penetrates the openings and falls down on the pigs and thereby assists in cooling said pigs.

The building unit according to the invention may, of course, be shaped differently for floor and ceiling since depending on the climate a circulation may be necessary of a larger amount of cooling water than the amount conveniently containable in channels of the size present when wave troughs and wave crests are of equal size, and the difference in height between wave trough and wave crest is determined by the fact that the floor must not be unreliable for the pigs to walk on. Furthermore, reasons may exist for making the building units for floors and ceilings of different materials, preferably using the strongest possible material, e.g. stainless steel, for a floor, and for a ceiling, preferably a material having high heat conducting capacity, e.g. copper.

I claim:

1. A building unit for use both as a floor and a ceiling in a piggery, said building unit comprising a corrugated metal plate having a profile that includes plane parallel wave crests and troughs connected by walls which form an angle of about 45° with the two planes, the planes including flat surfaces forming the crests and flat surfaces forming bases in the troughs, the plate including openings in one of said planes, the unit further including a straight flange depending from one lateral edge thereof and a folded flange depending from the other lateral edge thereof, the flanges arranged for interlocking like adjacent building units when forming an assembly of the units.

2. A building unit as claimed in claim 1 wherein the corrugated metal is stainless steel.

3. A building unit as claimed in claim 1 wherein the openings are of a width not exceeding 9 mm.

4. A building unit as claimed in claim 1 wherein the openings in the plate are defined by recurved rims.

5. A building unit as claimed in claim 1 wherein the distance across the flat surfaces of the crests is equal to the distance across the flat surfaces of the bases of the troughs.

* * * * *